Sept. 13, 1955  J. MORPHIS ET AL  2,717,530
PROJECTED OPTICAL IMAGE POINTER
Filed July 9, 1952

JEHU MORPHIS
ELSTON SAMUEL
INVENTORS.

BY
Raymond A. Paquin
ATTORNEY.

2,717,530

PROJECTED OPTICAL IMAGE POINTER

Jehu Morphis and Elston Samuel, Garland, Tex., assignors to Leta S. Taylor, doing business as J. Y. Taylor Company, Garland, Tex.

Application July 9, 1952, Serial No. 297,882

8 Claims. (Cl. 88—24)

This invention relates to optical pointers and has particular reference to new and improved optical pointer means for pointing out particular parts of a projected image on a projection screen.

An object of the invention is to provide a new and improved optical pointer wherein the projected pointer image is adjustable to point to the particular portion of the image being pointed out.

Another object is to provide an optical pointer of the type set forth which is relatively simple and economical in construction, yet efficient in operation.

Another object of the invention is to provide an optical pointer of the type set forth which may be incorporated in a projection apparatus or formed separately and employed in combination with any type of projection apparatus.

Other objects and advantages of the invention will be apparent from the following description taken in connection with the accompanying drawings. It will be understood that changes may be made in the details of construction and arrangement of parts without departing from the scope of the invention as expressed in the accompanying claims, as the preferred form has been given by way of illustration only.

Referring to the drawing.

Figure 1:
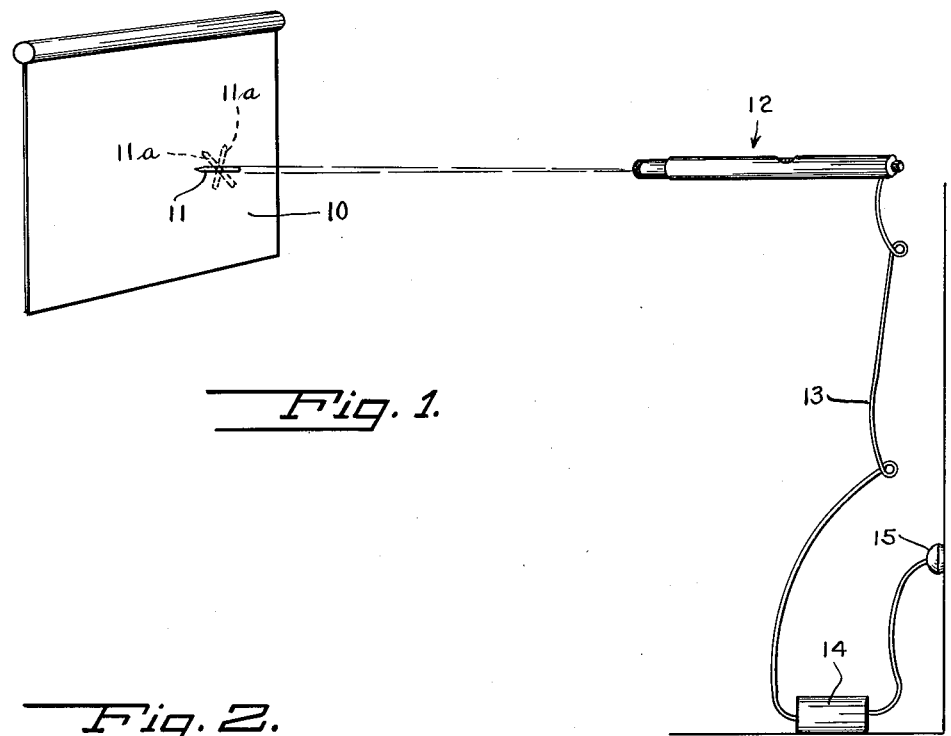
Fig. 1 is a diagrammatic view showing the optical pointer in use.
Figure 2:
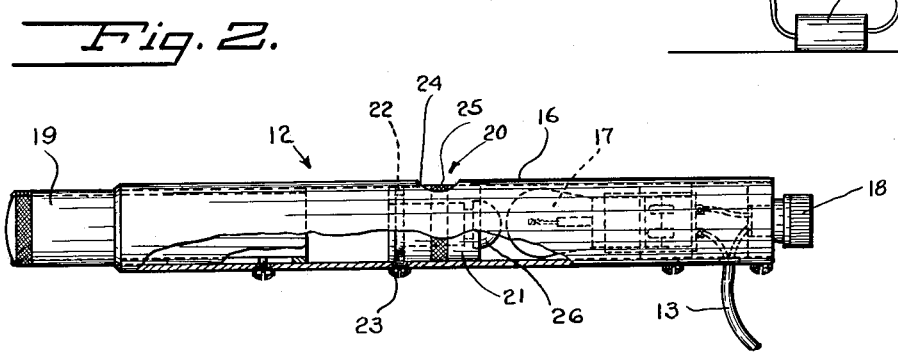
Fig. 2 is a side view, partially in section, of one form of optical pointer embodying the invention.

Referring more particularly to the drawings wherein similar reference characters designate corresponding parts throughout, there is shown in Fig. 1 a projection screen 10 on which is projected the image 11 of an arrow or other suitable indicating means formed by the optical pointer designated generally at 12 and which receives current through the line 13 and transformer 14 from the ordinary lighting source through the plug 15.

Examples of the various angular positions to which the projected arrow or pointing image can be rotated is shown at 11a in Fig. 1.

It will be seen that by rotating the pointing image or arrow 11 that the arrow will point directly to the portion of the projected image on the screen which it is desired to point out, which feature has not been possible with prior type optical pointers and which has the advantages of allowing the arrow to point to the portion of the projected image being pointed out, while the projected arrow or image does not overlie that portion of the projected image which is being pointed out, and allows the pointing image to point to the desired part of the projected image regardless of the location of such portion on the projection screen.

The optical or projection pointer shown comprises the casing or housing 16 in which is positioned the light source or lamp 17 adapted to be controlled by the switch 18.

Slidably mounted in the housing or casing 16 is the tube 19 containing the projection or objective lens system and which is slidable for the purpose of focusing the projected image on the projection screen.

Between the light source 17 and the projection or objective lens system 19 is positioned the condensing lens system 26, diaphragm designated generally at 20 and which comprises the tube or barrel 21 having the groove 22 in which is positioned a screw 23 held by the casing 16 for allowing rotation of the tube 21 without any longitudinal movement thereof. Within tube 21 is a diaphragm plate having a cutout or opening of the shape of the image to be projected such as the arrow 11 shown on the screen 10, although such opening could be of any desired shape.

In the side wall of the housing or casing 16 is the cutout 24 which allows access to the knurled rim 25 on the tube 21, whereby the tube 21 containing the diaphragm plate may be rotated by the finger or thumb to desired angular relation.

If desired, the transformer 14 could be incorporated into the housing 16. This transformer allows the use of a bulb or light source of desired voltage and if the bulb or light source employed is of the same voltage as that supplied from the source of current, the transformer could be eliminated.

In the operation of the device, the switch 18 is turned on to supply current to the bulb 17 and the projection or objective lens tube 19 is moved longitudinally to focus the projected image on the projection screen 10.

The projected image is then moved over the screen to the particular portion to be pointed out and by rotation of tube 21 through manipulation of knurled switch 25, the projected indicator or pointer such as the arrow 11 could be made to point to the particular portion of the projected image desired without overlying or in any way interfering with that portion.

From the foregoing it will be seen that we have provided simple, efficient and economical means for obtaining all of the objects and advantages of the invention.

We claim:

1. In an optical pointer, a housing, a source of light adjacent one end of said housing, a projection lens in optical alignment with said source of light, a rotatable diaphragm in said housing between said source of light and said projection lens, said diaphragm having a pointer to be projected on a projected image and a portion accessible through a wall of said housing for rotating said diaphragm.

2. In an optical pointer, a housing, a source of light adjacent one end of said housing, a projection lens in optical alignment with said source of light and a rotatable diaphragm between said source of light and said projection lens, an opening in the wall of said casing adjacent said diaphragm said diaphragm having a portion in said opening whereby said diaphragm may be rotated.

3. In an optical pointer, a housing, a source of light in said housing, a projection lens system optically aligned with said source of light, a diaphragm having an opening the shape of which is to be projected by said pointer and means for allowing the rotation of said diaphragm to change the direction of the projected image, said means comprising an opening in the wall of said housing adjacent said diaphragm, the periphery of said diaphragm being accessible through said opening.

4. In an optical pointer, a housing, a source of light in said housing, a projection lens system optically aligned with said source of light, a diaphragm having an opening the shape of which is to be projected by said pointer and means for allowing the rotation of said diaphragm to change the direction of the projected image, said means comprising an opening in the wall of said housing adjacent said diaphragm, the periphery of said diaphragm being accessible through said opening and friction means on the periphery of said diaphragm.

5. In an optical pointer, a housing, a source of light in said housing, a projection lens system optically aligned with said source of light, a diaphragm having an opening the shape of which is to be projected by said pointer and means for allowing the rotation of said diaphragm to change the direction of the projected image, said means comprising an opening in the wall of said housing adjacent said diaphragm, means on the periphery of said diaphragm whereby it may be rotated and a condensing lens system between said source of light and said diaphragm.

6. In an optical pointer, a housing, a source of light in said housing, a projection lens system optically aligned with said source of light, a diaphragm having an opening the shape of which is to be projected by said pointer and means for allowing the rotation of said diaphragm to change the direction of the projected image, said means comprising an opening in the wall of said housing adjacent the periphery of said diaphragm, and friction means on the periphery of said diaphragm whereby it may be rotated, and a condensing lens system between said source of light and said diaphragm.

7. In an optical pointer, a casing, a source of light, a projection lens system optically aligned therewith in said casing, a diaphragm between said source of light and said projection lens system, said diaphragm having an opening of the shape of the image to be projected and means on the periphery of said diaphragm and aligned with an opening in said casing and permitting rotation of said diaphragm to thereby effect rotation of said projected image, and a condensing lens system between said light source and said diaphragm.

8. In an optical pointer, a casing, a source of light, a projection lens system optically aligned therewith in said casing, a diaphragm between said source of light and said projection lens system, said diaphragm having an opening of the shape of the image to be projected and means including an opening in the wall of said casing adjacent said diaphragm for permitting rotation of said diaphragm to thereby effect rotation of said projected image, and a condensing lens system between said light source and said diaphragm, and switch and transformer means for controlling the current to said light source.

References Cited in the file of this patent

UNITED STATES PATENTS

| 778,891 | Rausch | Jan. 3, 1905 |
| 1,854,665 | Parker | Aug. 19, 1932 |
| 2,248,210 | Worthington et al. | July 8, 1941 |
| 2,357,542 | Pfeil | Sept. 5, 1944 |
| 2,528,681 | Berssenbrugge | Nov. 7, 1950 |
| 2,555,402 | Field | June 5, 1951 |

FOREIGN PATENTS

| 191,468 | Great Britain | Jan. 12, 1923 |